April 20, 1937.  L. H. COOPER  2,077,376
AUTOMOBILE DECKING DEVICE
Filed April 1, 1935  2 Sheets-Sheet 1
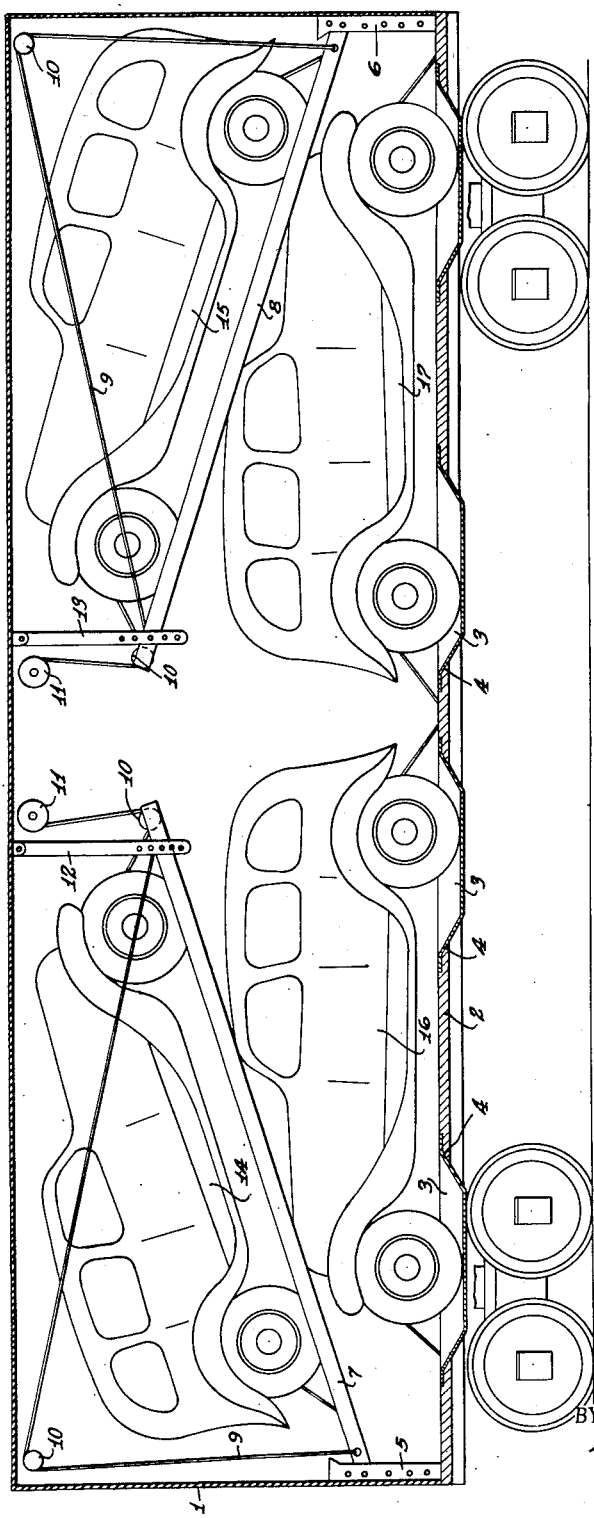
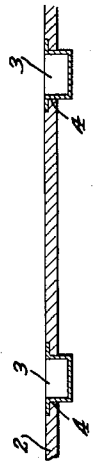
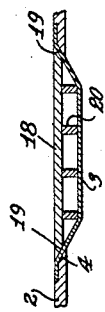
INVENTOR.
Lawson H. Cooper,
BY
ATTORNEYS April 20, 1937.  L. H. COOPER  2,077,376
AUTOMOBILE DECKING DEVICE
Filed April 1, 1935   2 Sheets-Sheet 2
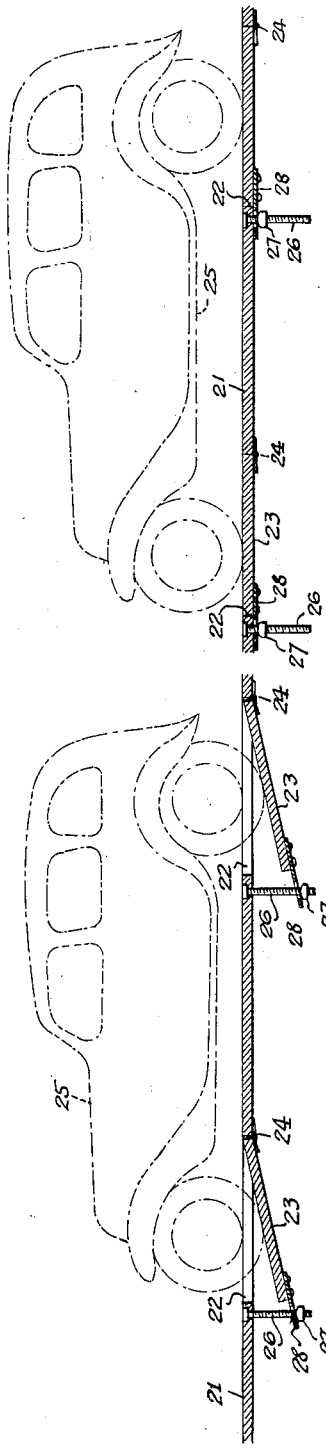
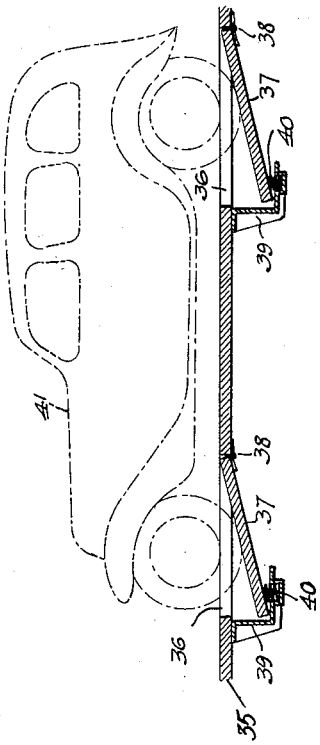
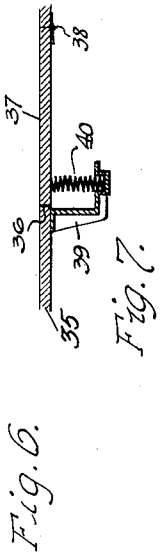
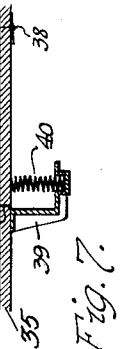
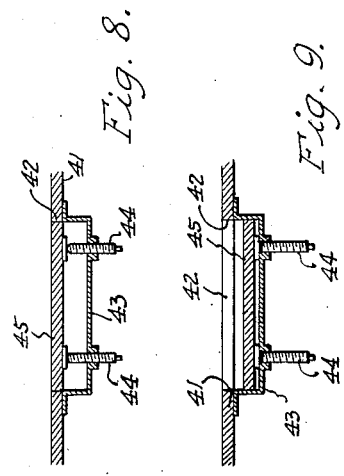
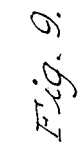
INVENTOR.
Lawson H. Cooper,
BY
ATTORNEYS Patented Apr. 20, 1937

2,077,376

UNITED STATES PATENT OFFICE 2,077,376

AUTOMOBILE DECKING DEVICE

Lawson H. Cooper, Flint, Mich.

Application April 1, 1935, Serial No. 14,086

11 Claims. (Cl. 105—368)

This invention relates to the shipment of automobiles in freight cars and has as its primary object to utilize space in freight cars which has heretofore been wasted because of the fact that the length of a freight car is not divisible by the length of any given number of automobiles. It is well known in the art that four of the shorter wheelbase automobiles is the maximum number which can be transported in a standard size freight car and that it has heretofore been found impossible to place four of the longer wheelbase automobiles, or four truck chassis, in a standard size freight car. The present invention, however, permits four of the longer wheelbase automobiles, or four truck chassis, to be placed in a standard freight car with sufficient clearance between adjacent automobiles so that they may be transported with safety. The clearance is important because during transit the freight car is subjected to severe shocks and a certain amount of flexibility is present in the conventional means which secures the automobiles in the freight car, with the result that a small amount of movement of the automobiles cannot be avoided relative to the freight car when the shocks occur, and it is of paramount importance that one automobile should not bump against another.

In the shipment of automobiles in freight cars it is common practice to support one or two automobiles in an inclined position so that part of another automobile, which rests upon the floor of the freight car, may extend under the elevated end of at least one of the inclined automobiles. In this manner three of the longer wheelbase type of automobiles have heretofore been placed in a standard size freight car. In the present instance, an automobile is supported in an inclined position in each end of the freight car and two automobiles are placed on the floor of the freight car so that the forward end of each extends under an elevated or inclined automobile. Ordinarily when an automobile was placed on the floor in this manner with its forward end under an inclined automobile its rear end extended to a point in the freight car which precluded the possibility of the fourth automobile being placed in the freight car. In order to permit the automobile, which rests on the floor, being moved nearer to the end of the freight car without coming in engagement with the inclined automobile or in too close proximity thereto, this invention provides wells in the floor of the freight car for the reception of the automobile wheels. When the wheels of the automobile are disposed in the wells the automobile is lowered so that it may be nested, to a greater extent than is ordinarily possible, beneath the inclined automobile. The additional space resulting from the increased nesting function permits a fourth long wheelbase automobile to be placed with safety in the freight car.

The invention has as a further object to provide means for covering the wells so that the freight car may be used for the transportation of ordinary freight on return trips to the point of shipment of the automobiles.

Still another object of the invention is to provide wells with elevating means adapted to raise the wheels of an automobile level with the floor surface for the purpose of making easier unloading operations.

With the above and other ends in view the invention consists in matters hereinafter set forth and more particularly pointed out in the appended claims, reference being had to the accompanying drawings, in which—

Figure 1 is a vertical cross section of a freight car illustrating four automobiles decked therein;

Fig. 2 is a transverse cross section of the floor illustrating the well members therein;

Fig. 3 is a cross section of a well member illustrating the well cover assembled therein;

Figs. 4 and 5 are cross sections of a freight car floor with a modified form of well construction;

Figs. 6 and 7 are cross sections of another form of well construction, and

Figs. 8 and 9 are cross sections of still another form.

Like characters of reference are employed throughout to designate corresponding parts.

In the freight car, which is generally designated by the numeral 1, the floor 2 is provided with a plurality of wells which comprise metal elements 3 received in openings 4 provided in the floor for the purpose of receiving the same. On opposite end walls of the freight car are provided brackets 5 and 6 for receiving and pivotally supporting the ends of decking platforms 7 and 8 respectively. Each platform has cables 9 attached thereto, trained over sheaves 10 and connected to winding drums 11 for the purpose of elevating the platforms and for the purpose of moving them to the inclined positions shown in Fig. 1. Attached to the ceiling of the freight car are links 12 and 13 which are connected to the platforms 7 and 8 respectively to support the free ends thereof after they have been elevated and inclined.

In loading automobiles in the freight car as above described the platforms 7 and 8 are lowered until they rest on the floor 2. Automobiles 14 and 15 are then moved onto the platforms and are secured thereon. Inasmuch as the particular means for securing the automobiles on the platforms forms no part of this invention and are well known in the art, it has been deemed unnecessary to describe such means in detail here. After the automobiles 14 and 15 have been placed on the platforms 7 and 8 respectively the platforms are elevated and inclined so as to permit the automobiles 16 and 17 to be placed therebeneath. Ordinarily there is not sufficient clearance to permit the two automobiles 16 and 17 to be placed in the freight car as shown in Fig. 1, but, as shown, when the automobiles 16 and 17 are moved beneath the automobiles 14 and 15 the wheels of the automobiles 16 and 17 enter the well forming casings 3 with the result that they are lowered sufficiently to permit them to be nested as shown while providing sufficient clearance between the automobiles that they will not bump against one another in transit.

As shown in Fig. 3 a cover is provided for the wells so as to provide a smooth floor surface after the automobiles have been unloaded from the freight car. This cover comprises a plate 18 having its ends chamfered at 19 to fit the inclined ends of the well casings 3 and with transverse reinforcing members 20 engaging the flat bottoms of the casings 3.

In Figures 4 and 5 the numeral 21 designates the floor of a freight car having openings 22 therein. To the end wall of each opening a trap door 23 is secured by a hinge 24. Means is provided for moving the trap doors from the positions shown in Figure 4, wherein the automobile 25 is in a lowered position, to the positions shown in Fig. 5 wherein the trap doors are level with the floor surface so that the automobile may be easily pushed along the floor. The means for moving the trap doors comprises screws 26 rotatably mounted in the floor 21 and having means 27 for the reception of a tool for rotating the screw. Nuts 27 received on the screws engage brackets 28 on the trap doors so that by rotating the screws the trap doors may be raised or lowered.

In Figures 6 and 7 the numeral 35 designates the floor of a freight car. In the floor are formed openings 36 and trap doors 37 are hinged to one of the end walls of each as shown at 38. Brackets 39 are secured beneath the floor 36 to limit the hinging movement of the trap doors and springs 40 are compressed between the trap doors and their respective brackets 39. When the wheels of the automobile 41 rest upon the trap doors the weight of the automobile compresses the springs so that the trap doors move to the position shown in Fig. 6. When the automobile is removed the springs move the trap doors to the position shown in Figure 7. The springs 40 may be provided with sufficient strength that no latching mechanism need be used to hold the trap doors in the position shown in Figure 7, but if circumstances should require it, any known latching mechanism known in the art and available on the market may be used.

In Figures 8 and 9 the numeral 41 designates the floor of a freight car having an opening 42 therein. Beneath the opening is provided a bracket 43 supporting screws 44 and on the upper ends of the screws is mounted a platform 45. By rotating the screws 44 the platform may be moved to the position shown in Figure 8 where it provides a smooth floor surface or it may be moved to the position shown in Figure 9 where a well is provided.

Although specific embodiments of the invention are shown and described it will be understood that various changes may be made within the scope of the appended claims without departing from the spirit of the invention, and such changes are contemplated.

What I claim is:—

1. In a transporting vehicle having a floor, said floor having openings therein corresponding in position to the wheels of an automobile, vertical movable elements in said opening each adapted in raised position to form a part of the floor and in lowered position to form wells in the floor into which the wheels of an automobile may be lowered, and means associated with each of said elements for elevating the same to raised position.

2. In combination with a freight car having a floor, platforms in the floor disposed in positions corresponding to the wheels of an automobile, means associated with each platform for raising and lowering the same independently of the others and thereby raise and lower the wheels of an automobile supported thereon, said platforms adapted in raised position to extend flush with the floor and form a portion thereof.

3. In a transporting vehicle having a floor, side and end walls, and a ceiling, means for elevating an automobile above said floor, means in said floor beneath said elevating means for lowering an automobile to reduce its height above the floor, said last means comprising four platforms disposed about the floor in positions corresponding to the four wheels of an automobile, and means associated with each platform for raising and lowering the same individually, said platforms in their raised positions adapted to extend flush with the floor and form a part thereof.

4. In combination with a transporting vehicle having a floor, a ceiling, side and end walls, an automobile decking frame positioned longitudinally within said vehicle between said side walls and adapted to elevate an automobile above said floor, said floor provided with four openings beneath said decking frame corresponding in position to the four wheels of an automobile, a platform movable in each of said openings and adapted in raised position to lie flush with the floor and form a portion thereof, each of said platforms being independently operable to descend below the level of the floor and carry the wheels of an automobile therewith whereby larger automobiles can be positioned in the space beneath the decking frame.

5. In a transporting vehicle having a floor, said floor having openings therein corresponding in position to the wheels of an automobile, vertical movable elements in said openings adapted in raised position to form part of the floor and in lowered position to form wells in the floor into which the wheels of an automobile may be lowered, and means associated with each of said elements operable to raise and lower the same independently of the others and while carrying the load of an automobile wheel.

6. In combination with a freight car having a floor, said floor having a plurality of sections each operable to descend below the level of the floor, said sections being spaced about the floor in such a manner that the wheels of an automobile may be positioned on the sections and lowered below the top surface of the floor, and means associated with each of said sections adapted to raise the sections while supporting an automobile thereon.

7. In combination with a freight car having a floor, said floor having a plurality of sections each operable to descend below the level of the floor, said sections being spaced about the floor in such a manner that the wheels of an automobile may be positioned on the sections and lowered below the top surface of the floor, means pivotally connecting one end of each of said sections adjacent the floor, and means associated with each of said sections adapted to act on the free ends of said sections and raise the same to floor level position.

8. In combination with a freight car having a floor, said floor having a plurality of sections each operable to descend below the level of the floor, said sections being spaced about the floor in such a manner that the wheels of an automobile may be positioned thereon and lowered below the top surface of the floor, and means associated with each of said sections resiliently acting to return the same to the level of the floor and adapted upon removal of the automobile therefrom to automatically return the sections to floor level position.

9. In combination with a freight car having a floor, said floor having a plurality of sections each operable to descend below the level of the floor, said sections being spaced about the floor in such a manner that the wheels of an automobile may be positioned thereon and lowered below the top surface of the floor, and means associated with each of said sections adapted to raise and lower the same in parallel relation to the floor level and while supporting the wheels of an automobile thereon.

10. In combination with a railway freight car having a floor, said floor having a section thereof movable from a raised position flush with the top level of the floor to a lowered position below the top level of the floor, said section being of a length and width to accommodate a road wheel of an automobile in any position in its movement, and means under said floor section adapted to raise the same while supporting a road wheel of an automobile thereon.

11. In combination with a railway freight car having a floor, means forming a part of said floor movable from a raised position flush with the floor to a lowered position below the floor, said means forming a support upon which one or more road wheels of an automobile may be disposed, and mechanism underneath said means adapted to raise the same while supporting one or more road wheels of an automobile thereon.

LAWSON H. COOPER.